INVENTORS.
HOWARD C. BAUER
ROBERT G. BELL
BY Fay, Sharpe & Mulholland
ATTORNEYS

INVENTORS.
HOWARD C. BAUER
ROBERT G. BELL
BY
*Fay, Sharpe & Mulholland*
ATTORNEYS INVENTORS.
HOWARD C. BAUER &
ROBERT G. BELL
BY
*Fay, Sharpe & Mulholland*
ATTORNEYS United States Patent Office 3,462,059
Patented Aug. 19, 1969

3,462,059
INTERNAL ALIGNMENT CLAMP
Howard C. Bauer, Bedford, Ohio, and Robert G. Bell, Calgary, Alberta, Canada, assignors to Bauer & Associates, Inc., Solon, Ohio, a corporation of Delaware
Filed Jan. 15, 1968, Ser. No. 697,930
Int. Cl. B23k 1/20, 5/22, 9/02
U.S. Cl. 228—5
13 Claims

ABSTRACT OF THE DISCLOSURE

A clamping assembly having a frame adapted to move through the interior of cylindrical pipe sections. A first and second set of clamping shoes are movably carried by the frame and are adapted to independently, clampingly engage the inner peripheral wall of the cylindrical pipe. Cam assemblies are operably connected to each set of clamping shoes to move them into engagement with the peripheral wall of the cylindrical pipe. An air travel motor operatively connected to a driving means in contact with the inner wall of the cylindrical pipe propels the clamping assembly. A system of levers and valves detect the position of the clamping assembly relative to the end of the pipe and through cooperation with the air travel motor prohibits it from falling out of the pipe. Manual means are also provided to govern the action of the air travel motor and, therefore, the movement of the assembly.

---

This application is an improvement of application Ser. No. 396,313, filed Sept. 14, 1964, for Internal Alignment Clamp, now Patent No. 3,362,603.

This invention relates to a clamp adapted to be used during a welding operation and more particularly to a clamp for holding elongated pipe sections in end-to-end relationship during the welding thereof.

A primary object of this invention is to provide an internal clamping device which, during its movement through a pipe, automatically senses the end of the pipe and stops in order to prevent falling out of the end thereof, thus damaging itself and possibly injuring personnel in the area.

It is also an object of this invention to provide a manual means for controlling the velocity and direction of the entire clamping assembly.

Another object of this invention is to provide a mechanism which aids in the initial alignment of the pipe sections and in particular, permits sections of pipe which are slightly out of round to be accurately aligned. Shoe clamps partially expand in the pipe to give it a circular cross section so that it can be accurately aligned with a second section of pipe.

Another object of this invention is to provide an internal clamping device which is adapted to hold two sections of pipe in end-to-end relation, with the clamp providing sufficient force to bring the inside periphery of each adjacent end section of the pipes to a substantially circular configuration and to stretch the wall of the pipe to a point slightly below the yield point.

Another object of the invention is to provide a clamping device which is capable of exerting a maximum clamping force throughout the range of maxmium and minimum inside diameters allowable for any specified pipe size.

A further object of the invention is to provide an internal aligning clamp adapted to clamp adjacent ends of two pipes with means interconnecting the clamping shoes thereby maintaining the relationship of the pipe ends despite the presence of exernal forces acting on the pipes.

Still a further object of the invention is to provide an internal alignment clamp which utilizes specially designed removable shoes adapted to accommodate different sizes of pipes.

The above objects, as well as others which will become more apparent upon a complete reading of the specification, are accomplished by an internal alignment clamp comprising two clamping sections, each section operating one set of expanding clamping shoes. These clamping shoes are adapted to contact the internal periphery of a section of pipe, with each set of shoes being independently operable thereby permitting the positioning and clamping of one pipe section prior to the positioning and clamping of another pipe section. The clamping force for each set of clamping shoes is supplied by an air operated piston which actuates an axially movable cam assembly consisting of a cam hub and cam blocks. The cam blocks act on force arms which are connected to push rods mounting the clamping shoes. As the force arms are displaced radially outwardly, a corresponding radial movement is imparted to the push rods and shoes until the shoes are in clamping engagement with the wall of the pipe.

The cam contour on the face of the cam blocks includes a fast rise portion which is operable during the initial movement of the cam assembly and a slow rise portion which is operable during the application of the force to effect clamping of the shoes.

The sets of clamping shoes are released by exhausting the air operated piston and introducing air pressure acting in an opposite direction thereby retracting the cam assembly and permitting the return of the force arms, push rods and shoes under the bias of appropriate springs.

An additional feature is the provision of a link interconnecting the shoes of one set with the shoes of the other set. Thus, each shoe has a link pivotally connected at one end to it and the other end of the link is pivotally connected to the corresponding shoe in the other set of clamping shoes. The purpose of the links is to maintain the spaced relation of the shoes when in the clamped position and thereby maintain the relationship between the adjacent ends of the pipe sections.

Still another feature is the incorporation of specially designed shoes which include an angular contacting surface so that the radial deformation of the pipe wall is greatest at the end point and decreases axially inwardly of the pipe. In addition, the shoes are removably carried by the push rods so that different configurations and sizes of shoes may be readily utilized to accommodate different sizes and configurations of pipes.

A further feature of the invention is the provision of a novel method to effect the welding of the pipe sections in an end-to-end relationship by deforming the ends of the pipes to a substantially circular configuration and at a point below the yield point of the material, welding the ends of the pipes circumferentially and releasing the clamps.

Another feature of this invention is the inclusion of an air travel motor which propels the clamping assembly along the internal wall of the cylindrical pipe. The air travel motor is connected by means of a conventional transmission means to a driving wheel which engages the internal periphery of the pipe. A system of valves governs the speed and direction of the motor which propels the clamping assembly. The system of valves may be governed either manually or automatically. The automatic valve system includes pivotably mounted levers which sense the terminal end of the pipe and send pneumatic signals to the air motor which slow and/or stop the assembly at a predetermined position. The automatic valve system also provides for the clamping of shoes against the internal periphery of the pipe after it has stopped at the end of the pipe.

A feature is also provided in the present invention which compensates for out of round pipe sections which must be aligned with a second pipe section. In this respect, a partial stroke mechanism forces the out of round pipe into a nearly round configuration so that a second pipe may be subsequently aligned with it. In this respect, the part stroke mechanism includes an auxiliary cylinder and piston which when actuated, causes a partial stroke of the main piston in the main cylinder. In this manner the clamping shoes engage the section of the pipe with the smallest diameter and cause it to expand, thus drawing in the oversized portions and forcing the end of the pipe into a nearly round configuration. It is then relatively easy to align the center line of the pipe with the center line of another pipe for the purpose of welding them together.

To the accomplishment of the foregoing and related ends, the following description sets forth in detail one approved means of carrying out the invention. Such disclosed means is not meant to be limiting inasmuch as it constitutes but one of the various ways in which the principles of the invention may be applied.

In the drawings wherein like reference numerals indicate like parts in the various views.

Figure 1:
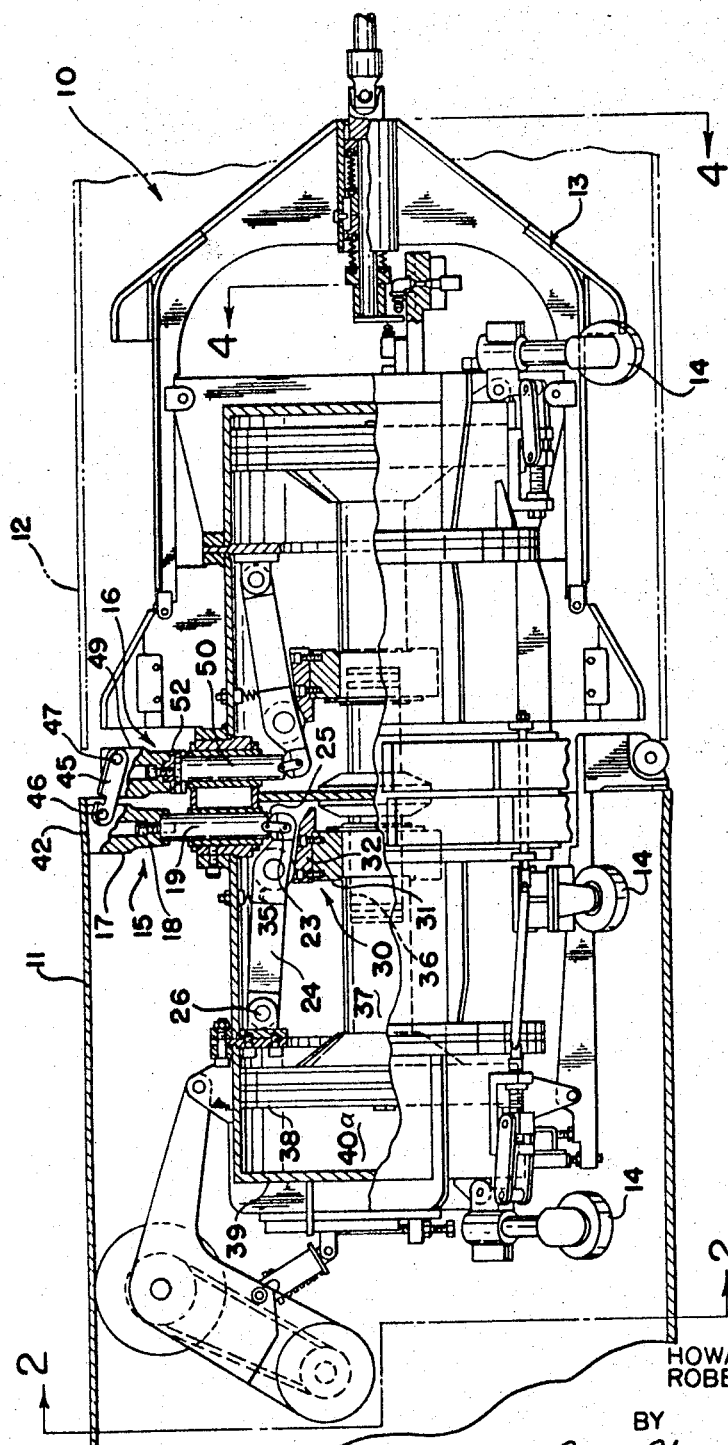
FIG. 1 is a side elevation view in section showing the clamp assembly in the pipe sections, with one section clamped in position.

Referring to FIG. 1, there is illustrated the clamp assembly indicated generally by the reference numeral 10. The clamp assembly 10 is adapted to be received in cylindrical pipe sections such as indicated by 11 and 12, with the pipe sections being adapted to be welded in end-to-end relationship. The function of the clamp assembly 10 is to grip the adjacent ends of the pipes 11, 12 and maintain the pipes in end-to-end relationship during the welding operation.

The clamp assembly 10 comprises a vehicular unit including a frame 13 on which there is mounted a plurality of rollers 14. The rollers are adapted to render the unit mobile for passage through the pipe sections. An appropriate driving mechanism is supported by the frame along with actuating means for controlling the movements of the assembly.

The frame 13 further includes two sets of clamping shoes which are indicated generally by the reference numerals 15, 16. Each of the clamping shoe assemblies is substantially identical to the other so that, for purposes of disclosure, only the details of the clamping shoe assembly 15 will be discussed.

Figure 2:
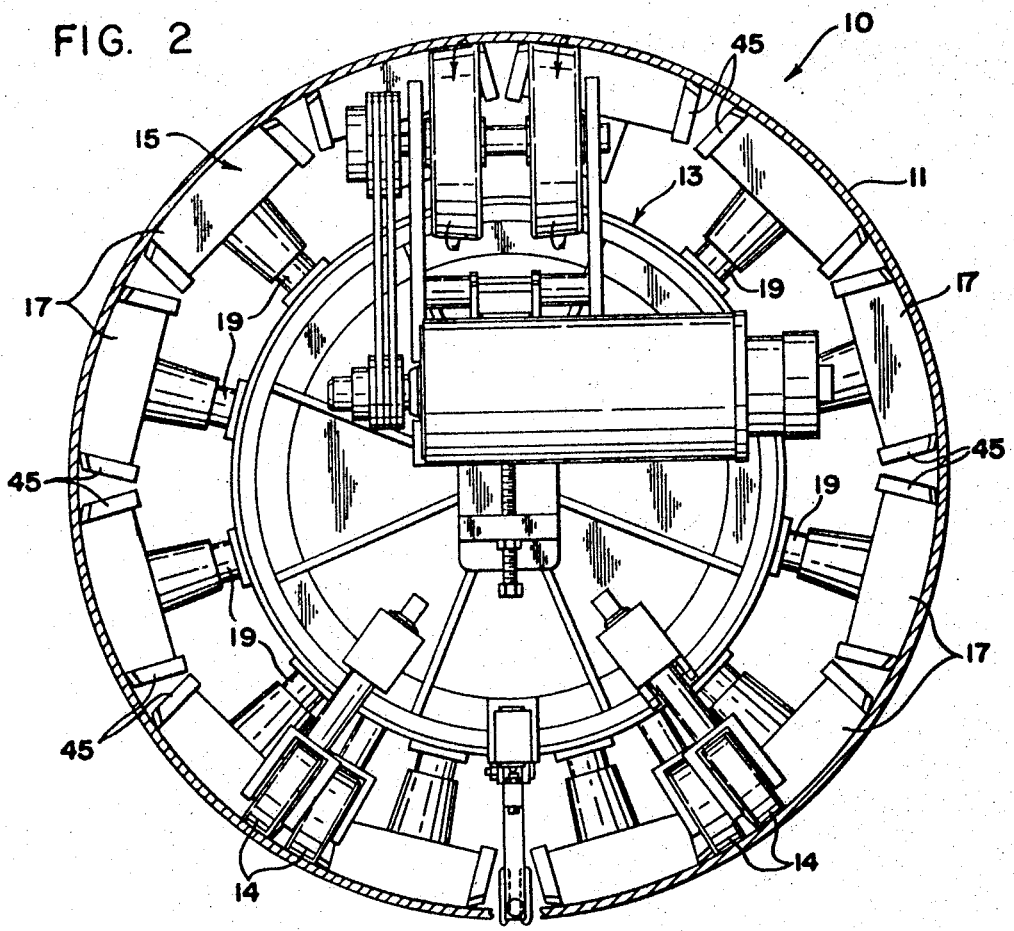
FIG. 2 is an end elevation view taken along line 2—2 of FIG. 1.

The clamping shoe assembly 15 comprises a shoe 17 which is attached by means of a bolt 18 to one end of a push rod 19. As shown more clearly in FIG. 2, a plurality of identical shoes 17 are spaced around the entire circumference of the pipe section 11 so that an even distribution of the clamping force is obtained. The push rod 19 is received in a guide 20 carried by the frame 13. In addition, each of the shoes 17 is slidably received between guiding surfaces carried by the frame as shown in FIG. 2.

Connected to the radially inner end of the push rod 19 is a link 23 which is also connected to a force arm 24. The force arm includes a contoured surface 25 which engages the inner end of the push rod 19 with the link 23 serving to maintain this abutting relationship. The force arm 24 is connected by a pivot 26 to the frame 13 so that the force arm 24 may pivot relative to the frame. An appropriate biasing means such as springs 27 are associated with each force arm-push rod combination so that each shoe 17 is normally biased radially inwardly away from engagement with the wall of the pipe section.

To engage the shoe 17 with the pipe wall, there is provided a cam assembly, indicated generally by the reference numeral 30. This cam assembly includes a hub 31 on which there is secured a plurality of cam blocks 32. Each cam block includes a contour face of two configurations, the first being a relatively steep sloping face 33 followed by a slow rise portion 34. Adapted to engage the face contour of the cam block is a roller 35 carried by the force arm 24 intermediate its ends. The cam assembly 30 is adapted to be displaced longitudinally of the clamp assembly so that engagement of the roller 35 on the face contour of the cam block 32 effects a pivoting radial displacement of the force arm which in turn radially displaces the clamping shoes. The longitudinal movement of the cam assembly is supported by a guiding portion 36 secured to the frame 13.

Figure 3:
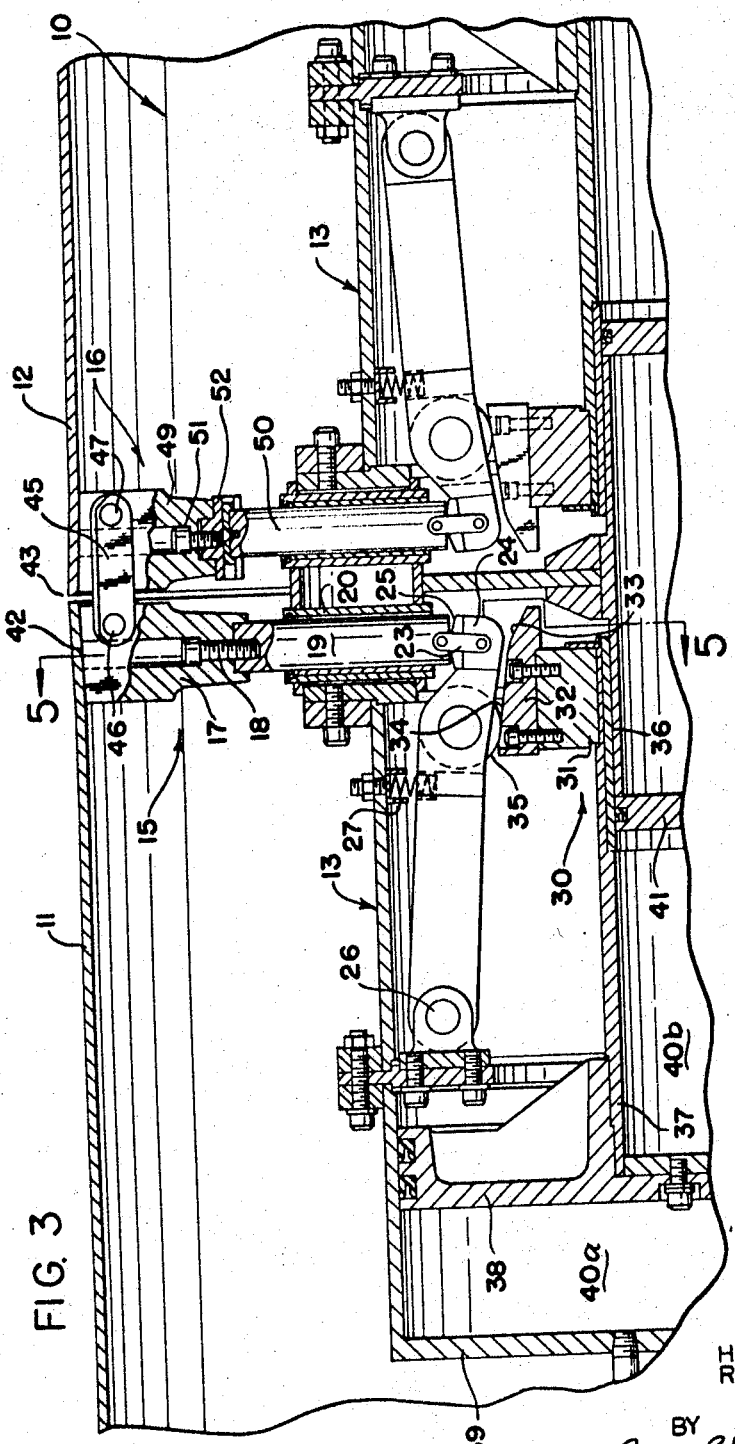
FIG. 3 is a partial section similar to FIG. 1 showing both pipes clamped by the assembly.
Figure 4:
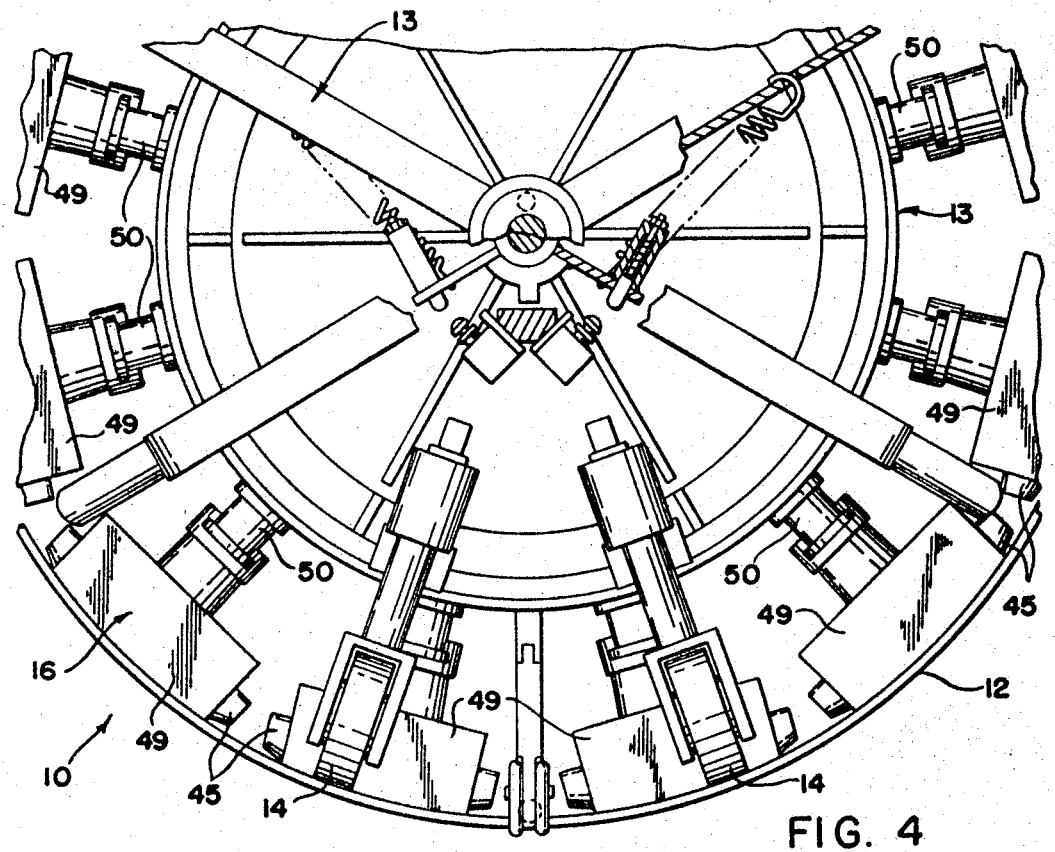
FIG. 4 is a view taken along line 4—4 of FIG. 1.
Figure 5:
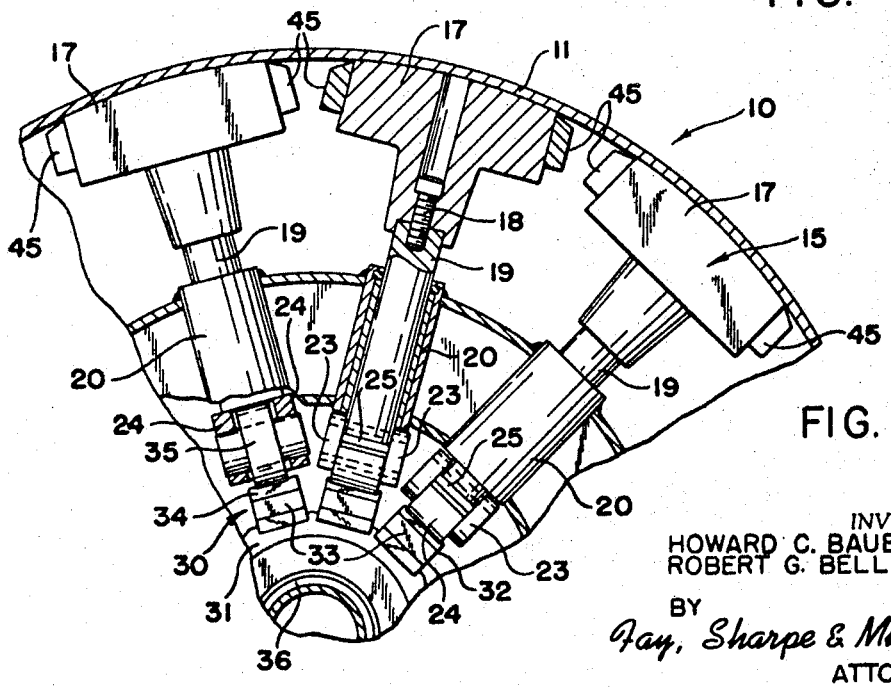
FIG. 5 is a view taken along line 5—5 of FIG. 3.

The assembly 30 includes a tubular extension 37 to which there is secured a piston 38. The piston 38 cooperates with a wall portion 39 on the frame to define a first fluid chamber 40a. Similarly, the extension 37 cooperates with wall portion 41 of the guiding frame 36 to describe a second fluid chamber 40b. It is believed to be apparent that with air pressure in the chamber 40a acting against the face of the piston 38, a longitudinal movement of the cam assembly will be effected. Upon exhaustion of the air from the chamber 40a and introduction of pressure in chamber 40b, retraction of the cam assembly to its initial position will be effected. The precise means for supplying the air pressure to the chambers has not been described inasmuch as it does not comprise any part of the present invention. The operation of the device above described is as follows: The vehicular unit is moved along a pipe section until the clamping shoe assembly is in position adjacent the end of the first pipe section 11. In this position, air pressure is introduced into the chamber 40a causing the cam assembly 30 to be displaced to the right as viewed in FIGS. 1 and 3. As the cam assembly is displaced, the roller 35 first engages the contoured surface 33 on cam block 32. The steep contour 33 effects a relatively fast rise of the force arm and the push rod during the first portion of the cam travel thus bringing the shoe 17 rapidly into proximity of the pipe wall. As the cam assembly 30 continues its longitudinal travel under the air pressure and as the shoe 17 commences to exert a clamping force against the pipe wall, the roller 35 engages the slow rise portion 34 of the cam for applying the maximum force against the pipe wall. The pressure in the chamber 40a and the spacing of the shoes are such that the pipe wall is deformed uniformly around its periphery to a substantially true circular configuration. The pipe wall is stressed and deformed by the shoes 17 to a point just below the yield point of the material. In addition, as shown in FIG. 3, the configuration of the contacting face of the shoe 17 is such that a greater deformation of the pipe wall occurs at the terminal portion of the pipe and tapers radially inwardly axially of the pipe. This is shown in exaggerated detail in FIG. 3 wherein the tapering face configuration of the shoes is clearly visible at 42.

It is important to note that the deformation of the pipe wall is accomplished by providing sufficient travel of the cam assembly to compensate for any deviations in the inside diameter of the pipe. Thus, if a pipe section has a minimum inside diameter allowable for the specific pipe size, less longitudinal travel of the cam assembly will be required to cause engagement of the shoes with the pipe wall. On the other hand, assuming a pipe section having a maximum inside diameter of the pipe for the specified pipe size, additional cam travel is required, and provided, to displace the clamping shoes a greater distance radially thereby to compensate for the variation in the inside diameter of the pipe. This is to be contrasted with the prior art wherein tolerance variations in the diameter of the pipe sections prevented the application of a uniform force on the pipe wall.

By providing a tapered configuration on the face 42 of the clamping shoes, a circular peak is formed at the juncture of the two pipe sections as shown at 43. This circular peak provides compensation for the weld material as it cools and contracts after the welding operation.

Figure 6:
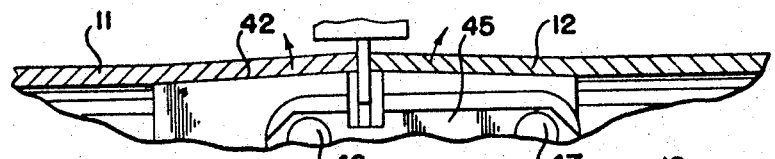
FIGS. 6, 7 and 8 depict schematically some of the steps involved in securing the pipes in end-to-end relation.
Figure 7:
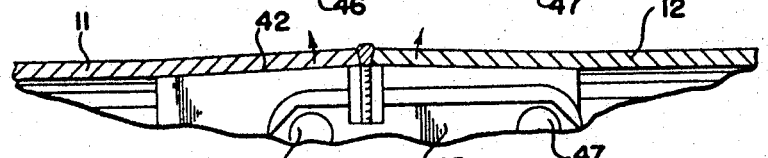

Assuming the pipe 11 is in a clamped position as shown in FIG. 1, a second pipe section is moved into position adjacent the end of the pipe section 11. The new pipe section 12 is guided in its positioning movements by external mechanism known to those having ordinary skill in the art and is spaced from the end of pipe section 11 by appropriate spacing mechanism as shown schematically in FIG. 6. Once the pipe section 12 is in position, the second set of clamping shoes 16 are actuated in a manner similar to that described in connection with the clamping shoes 15 so that the two pipe sections 11, 12 are restrained by the frictional grip of the internal clamps.

To assure the continued alignment and spaced relationship of the pipe sections 11, 12, there is included a link 45 which is pivotally connected at 46, 47 to shoes 15, 16 respectively. It is contemplated that each set of shoes would include a link similar to link 45 and appropriate slots are provided in the shoes to compensate for the pivoting of the link 45 during relative motion between the shoes, such as that shown in FIG. 1. The link 45 serves to maintain the sets of shoes 15, 16 in a spaced relation so that with the pipe ends clamped as shown in FIG. 3, there is no possibility of the pipe sections being displaced relative to each other. Moreover, by using a link 45 between each pair of shoes, any external forces acting on the shoes is not transmitted to the push rods, guides or frame assembly.

Figure 8:
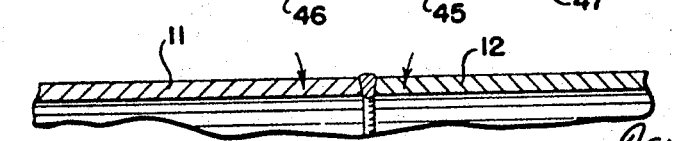

Assuming the pipe sections 11 and 12 to be spaced and clamped as shown in FIG. 3, a weld is laid at the peak 43 as shown in FIG. 8 thereby securing the two pipe sections in end-to-end realtionship. With the weld completed, the shoe assemblies 15, 16 are retracted by introducing air into the chamber 40b thus returning the cam assembly 30 to its original position and permitting the biasing means 27 to retract each shoe radially away from contact with the pipe wall. With the shoes retracted, the vehicular unit may be advanced through the pipe section to the next joint to be completed.

As additional compensation for rendering the assembly adaptable to different sizes of pipes, the shoes are removably carried by the shoe assemblies. Thus, shoe 17 may be removed from its push rod by removing bolt 18. In this manner, shoes of varying thicknesses and heights may be inserted to accommodate smaller or larger pipes than those shown in FIG. 3. The shoe 49 in the shoe assembly 16 is mounted on its push rod 50 in a somewhat different manner. Thus, a bolt 51 secures the shoe 49 removably to a mounting bracket 52. The bracket 52 in turn is adjustably mounted by a slotted guide arrangement to the outer end of the push rod 50. This arrangement permits lateral adjustment of the shoes in the sets 15, 16 relative to each other.

Figure 9:
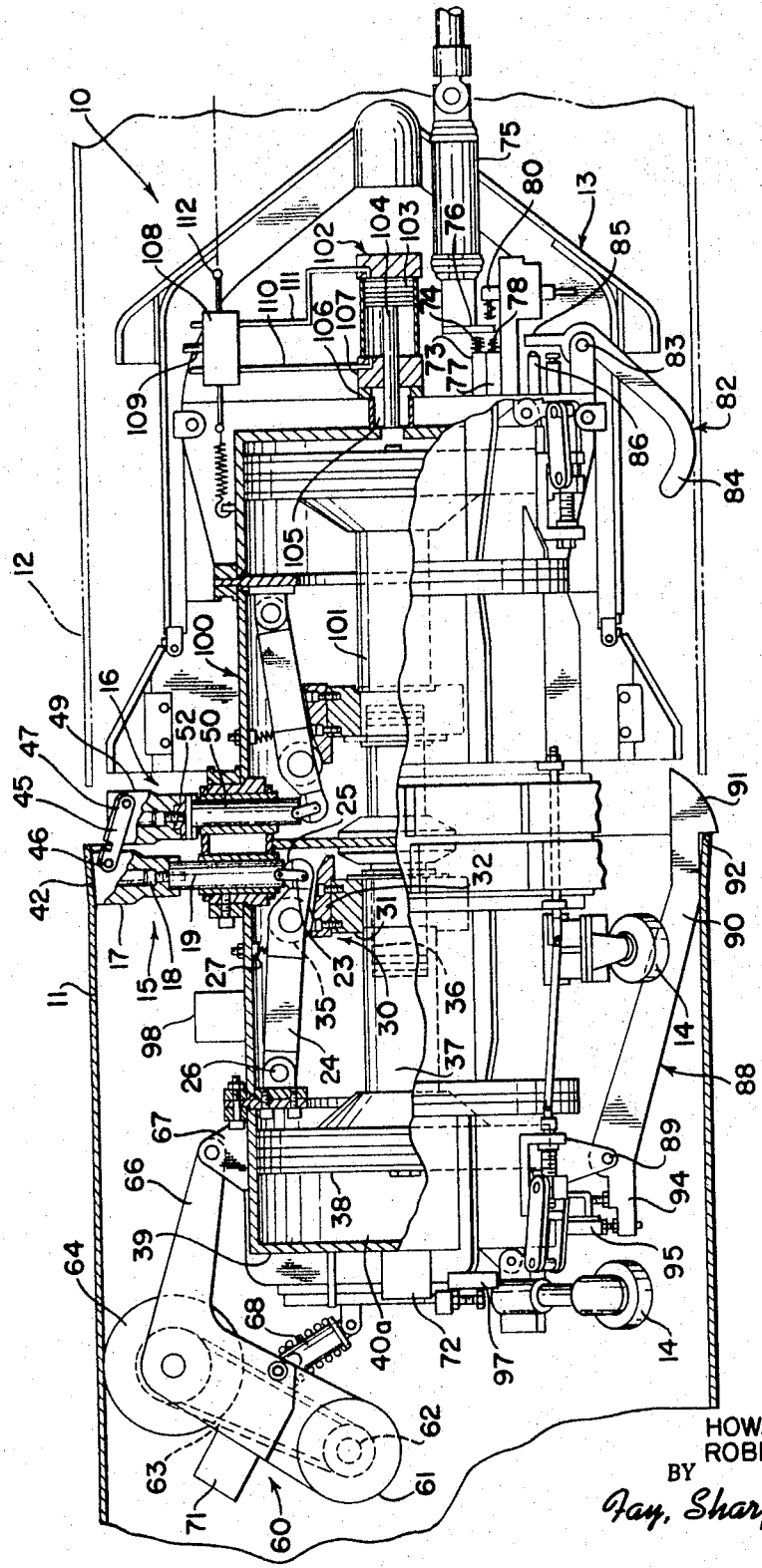
FIG. 9 shows a partial stroke mechanism and a propelling means on the assembly.

As illustrated in FIG. 9, the clamping assembly 10 may be provided with a means for governing the speed and direction with which the entire unit moves through the interior of the pipe and for automatically stopping it at the terminal end thereof. Broadly, the speed and direction of the unit is governed by a system of valves which signal an air travel motor to propel the entire assembly. The means for automatically halting the assembly at the end of the pipe include a pair of levers which sense the position of the clamping assembly relative to the end of the pipe and transfer a signal through the system of valves to the air travel motor to halt the assembly before it propels itself beyond the support of the pipe.

This mechanism solves a very serious problem in prior art devices. Previously when a weld was completed, a rod connected near the front of the unit was rotated in a counterclockwise direction to release the clamping shoes. A signal was then sent by remote control cable to start the forward motion of the air motor. Once the clamp assembly started to move forward, there was no way to stop or control its forward motion until it reached the terminal end of the pipe where the controls mounted on the forward end of the clamp could be reached.

Due to the lack of positive control or safety mechanisms, the clamping assembly, particularly in hilly country, frequently ran out of the terminal end of the pipe and dropped to the ground with the resulting danger and/or injury to both the clamping assembly and personnel. These accidents were at best time consuming and often very costly and dangerous, since the clamping assemblies are often in excess of three feet in diameter and weigh many hundred pounds.

Assuming that the operator could stop the device, it was then necessary to gauge the terminal end of the pipe and reset the clamping shoes therein. The clamp was then in a position to receive a second section of pipe in preparation for welding.

In order to overcome these deficiencies, the present invention provides a manual reach rod control and an automatic safety device to slow the travel at the terminal end of the pipe. The automatic safety device includes a reverse feature which positions the rear clamipng shoe at the terminal end of the pipe and automatically expands them. These features, in combination, provide an extremely positive constant control of the clamp travel, and make the probability of the clamp accidentally running out of the end almost zero.

The particular mechanism involved includes a means for driving the clamping assembly 60 comprising an air travel motor 61 turning a drive shaft 62. A belt 63 contacts the drive shaft 62 and transmits the motion to a driving wheel 64 which rolls along the inner periphery of the pipe 11. A brace 66 pivotably mounted on a bracket 67 in conjunction with an adjustable support 68 supports the air travel motor 61 and wheel 64.

A fast travel control valve 71 causes the air travel motor 60 to drive the assembly 10 at relatively high speeds. The fast travel control valve 71 has three possible positions which provide for fast travel forward, neutral and fast travel reverse. A slow travel control valve 72 causes the air motor to operate in a similar fashion but at slower speeds. The slower speeds are usually accomplished by using lower pressures in the input to air motor. It is known, however, that other methods may be used to accomplish the same end. The operation of the details of the pneumatic controls, valves, signals and air motor are well known to those skilled in the art (see Pneumatic Handbook, 1st edition, Trade & Technical Press Ltd. 1966) and will not be described in detail.

The control valve 71 receives signals from a pressure valve 73 having a spring-biased stem 74. A manually operable actuating rod 75 having an arm 76 is mounted in the vicinity of and is used to actuate the pressure valve 73. In a similar manner, a pressure valve 77 with a spring-biased stem 78 can be actuated by the rod 75 to send pneumatic signals to the control valve 71. The pressure valve 73, when actuated, causes the control valve 71 to be placed in neutral while the pressure valve 77 causes the control valve 71 to run the air travel motor 61 in a reverse direction at a relatively fast speed. This motion signalling the control valve 71 to move to the position corresponding to fast travel forward for the air travel motor 61.

In this manner an operator may manually control through the control rod 75 the forward and reverse movement in the entire clamp assembly. When the rod 75 is moved rearward, for example, it actuates pressure valve 73, thus putting control valve 71 in a neutral position and stopping the forward motion of the air travel motor. Further back pressure causes the actuation of pressure valve 77 which places fast travel control valve 71 in a reverse position, thus reversing the direction of the air motor 61. Release of the pressure on the rod 75 causes the travel motor to go back to the forward direction of the relatively fast speed.

A forward lever 82 near the forward section of the clamping assembly is pivotably mounted at 83 and has an arced pipe-contacting leg 84. On the opposite side of the pivot from the leg 84 is an arm 85 which is in the proximity of a pressure valve 86. The pressure valve 86, when actuated by the motion of arm 85, sends a signal to the control valve 71 to move it to the neutral position and simultaneously causes the slow travel control valve 72 to move to the forward position.

A rear lever 88 has a forward extending leg 90 with a cammed face 91 which leads to a transverse surface or latch 92 which is adapted to grasp the terminal end of the pipe 11. A valve control arm 94 on the rear lever 88 is operatively connected to a pressure valve 95 which sends a signal to the control valve 72 for reverse slow travel, thus causing the air travel motor 10 to move at a relatively slow speed in the reverse direction. A bypass valve 97 is actuated by a subsequent pressure build up and acts to neutralize the control valve 72 as explained more fully hereinafter.

In operation, the operator may move the rod 75 to engage the pressure valve 80 or valves 73 and 77 to signal the fast travel control valve 71 to move forward, backward or remain neutral. As the clamping assembly moves near the terminal end of the pipe, the forward lever 82 is released from the inner wall of the pipe and either by means of spring biasing or of its own weight rotates about the pivot 83. In so rotating, the arm 85 on the lever 82 engages the pressure valve 86, thus moving the fast travel control valve 71 to neutral and causing the slow travel control valve 72 to move to the forward position. The entire clamp assembly thus slows down but continues to move forward.

As the clamping assembly 10 moves slowly forward, the front of the rear lever 88 moves out of the terminal end of the pipe, and pivots downwardly. As it pivots downwardly, the arm 94 engages the pressure valve 95, thus causing the control valve 72 to move to a slow travel reverse position. The clamp assembly then moves in a reverse direction until the latch 92 engages the terminal end of the pipe stopping the reverse travel. The engagement of the arm latch on the terminal end of the pipe stops the reverse motion of the clamp and causes a build-up in pressure in the air line connecting control valve 72 with the air travel motor. The pressure build-up in the system is used to signal that the clamp is positioned at the terminal end of the pipe. When the pressure builds up to a predetermined point, the bypass valve 97 is activated and causes a control valve 98 to apply air pressure against the piston 38 which moves the cam surface 32 to engage the rear set of clamp shoes 17. The by-passed air also causes the control valve 72 to move to the neutral position cutting off the air flow to the air travel motor so that it is not acting against the clamped shoes. The clamp is thus located and expanded in position, the air motor is off and the assembly is ready to accept a second section of pipe to be aligned with the first and welded in position.

A particular problem arises if the second section of pipe, which would be 12 as shown in FIG. 9, is not exactly round. The walls of the two sections of pipe will not be aligned and a plane-to-plane relationship cannot be determined. Because the clamping shoes must have, when in a retracted position, a small enough diameter in order that the assembly can negotiate bends in the pipe, they will normally not engage the pipe in a retracted position, even if it is slightly out-of-round. The shoes thus do not assist in obtaining a proper alignment of the pipes when they are in a retracted position. In the event that the pipe sections are not properly aligned and the clamp shoes are expanded in the second section, the walls of the two pipes may overlap and cause damage to the terminal ends of the pipes or the clamp assembly. Moreover, when the clamp assembly is used with a welding machine which is equipped with a mechanically operated system of spacing between the end planes of the pipes, this mechanism may be damaged by the misalignment of the end planes of the two pipe sections.

In order to overcome the above problems, a system is provided by which the second pipe is brought to a near round condition and held in alignment within approximately ⅛ of an inch, center line to center line, while the end planes are brought into alignment. Broadly, the out-of-round pipe is moved into a position which leaves approximately ½ inch space between the pipe ends, at which time the front clamp shoes are expanded by a part stroke mechanism. This mechanism expands the shoes to a diameter approximately ⅛ of an inch smaller in diameter than the inside diameter of the pipe section. This allows the second section of pipe to be manipulated to obtain the necessary plane-to-plane relationship at which time the front set of shoes are fully expanded to clamp the second section of pipe into position.

In order to accomplish the partial expansion of one set of clamping shoes, a main cylinder 100 and a main piston 101 is used in conjunction with an auxiliary cylinder 102 and auxiliary piston 103. The auxiliary piston and cylinder are positioned forward of the main cylinder and piston so that they are in proximity of the main piston when it is in a retracted position. An auxiliary piston stem 104 may contact the head of the main piston 101 by means of an opening or passage 105.

Shims 106 are placed behind the end 107 of the auxiliary cylinder 102, thus allowing flexibility in the amount of travel obtained from the auxiliary piston 103. A valve 108 has an air inlet 109 and outlets 110 and 111. Air inlet 109 is connected to a source of pressurized air such as a conventional compressor. Outlets 110 and 111 are on either side of the piston 103 so that differential pressure may be applied by control valve 108 to the auxiliary cylinder 102 in order to control the travel of the auxiliary piston 103. The valve 108 is actuated manually by means of a control rod 112.

In operation, the spring-biased control arm 112 may actuate the valve 108 in order to force air through outlet 111 and against the piston. The travel of the auxiliary piston is governed by the width of the length of the cylinders and shims 106. During its initial travel, the piston stem engages the main piston 101, thus pushing it through part of its normal stroke. Partial movement of the main piston 101 causes a partial expansion of the clamping shoes and engagement of them with the out-of-round pipe. This engagement forms the pipe enough to allow an accurate alignment with another pipe which will be engaged by the second set of clamping shoes. The first set of clamping shoes is then fully engaged and the weld made.

Application of air pressure to outlet 110 moves the auxiliary piston back to its rest position.

Additional modifications and changes will suggest themselves to those having ordinary skill in the art. Changes such as these are contemplated by the principles of the invention so that although for ease of description, the principles of the invention have been set forth in connection with but one illustrated embodiment, it is not intended that this illustrated embodiment or the terminology employed in describing it is to be limiting, but rather, it is our desire to be restricted only by the scope of the appended claims.

We claim:
1. A clamping assembly comprising:
a frame;
means on said frame adapted to support said frame for movement through the interior of a cylindrical pipe section;

means for propelling said frame through said cylindrical pipe section;

clamping shoes movably carrried by said frame and being adapted to clampingly engage the inner peripheral wall of the cylindrical pipe;

means on said frame operatively connected to said sets of clamping shoes operable to engage said sets of shoes with the pipe wall;

valve means for regulating automatically the speed and direction of the means for propelling said frame;

means for sensing the terminal end of the pipe on said frame, said means for sensing being operatively connected to said valve means.

2. The clamping assembly of claim 1 in which said means for propelling includes an air travel motor which is operatively connected to a driving wheel in contact with the inner peripheral wall of the pipe.

3. The clamping assembly of claim 2 in which said valve means for regulating includes a system of valves which automatically regulate the speed and direction of said air travel motor as it nears the terminal end of the pipe.

4. The clamping assembly of claim 3 in which said system of valves includes a fast travel value having three positions which may cause the air travel motor to move relatively fast in a forward or reverse direction or remain neutral.

5. The clamping assembly of claim 4 in which said system of valves includes a slow travel valve having three positions which causes said air travel motor to move relatively slow in a forward or reverse direction or remain neutral.

6. The clamping assembly of claim 5 in which said means for sensing includes a pivotally mounted lever means which moves along the internal periphery of the pipe and is operatively connected to said system of valves for regulating at least part of said system of valves so that as said frame moves near the end of said pipe, it will signal said system of valves and said air travel motor to stop forward motion.

7. The clamping assembly of claim 5 wherein said means for sensing includes a first forward and a second rear lever positioned behind said first lever as said clamp assembly moves in a forward direction, said forward lever being operatively connected to a first control valve regulating the fast travel of the air motor, said first control valve supplying air to said air motor for fast travel forward while said forward lever rides along the internal periphery of said pipe and when said forward lever exits from the terminal end of said pipe, it signals said first control valve to move to a neutral position and also signals said slow travel valve to move to the forward position, said second lever pivotably mounted and having an extension which senses the end of the pipe, means for operatively connecting said second lever to said slow travel valve whereby said slow travel valve reverses the flow of air into the air motor when said rear lever senses the terminal end of said pipe, thus reversing the direction of the entire clamping assembly, a latch means on said rear lever to engage the end of said pipe and stop the reverse motion of the assembly, said lever also actuating a valve which causes clamping shoes to expand and engage the internal surface of the pipe after said second lever has engaged the end of said pipe and, valve means for placing said air motor in neutral.

8. The clamping assembly of claim 1 wherein manually operated valves are operatively connected to said air travel motor to govern its forward and reverse motion, and a reach rod is provided to actuate said manually operated valves.

9. The clamping assembly of claim 1 in which a means for actuating a first set of shoes, an auxiliary cylinder in provided and includes a main cylinder and a piston therein for actuating a first set of shoes, an auxiliary cylinder in fluid communication with said main cylinder, an auxiliary piston in said auxiliary cylinder, said auxiliary piston having an extension thereon which contacts said main piston when said auxiliary piston is actuated and moves the main piston a portion of its full stroke.

10. The clamping assembly of claim 9 which includes means for providing differential air pressure to said auxiliary cylinder by a manually controlled air valve.

11. The clamping assembly of claim 3 which includes means for providing partial actuation of a set of said clamping shoes.

12. The clamping assembly of claim 11 in which there are a first and a second set of independently operable clamping shoes and links supported by and interconnecting said sets of shoes to permit the relative radial movement and to assure the rigid spaced relationship of said shoes when said shoes are in clamping engagement with the pipe wall.

13. A clamping assembly comprising:

a frame;

means on said frame adapted to support said frame for movement through the interior of a cylindrical pipe section;

means for propelling said frame through said cylindrical pipe section;

clamping shoes movably carried by said frame being adapted to clampingly engage the inner peripheral wall of the cylindrical pipe, said clamping shoes including a first and second set of independently operable clamping shoes;

means on said frame operatively connected to said sets of clamping shoes operable to engage said sets of clamping shoes with the pipe wall, said means operable to engage said sets of shoes including a main cylinder, a main piston and a source of pressurized air;

a piston means for creating a partial actuation of said clamping shoes including an auxiliary cylinder and an auxiliary piston therein, said auxiliary piston being accessible to said main piston so that movement of said auxiliary piston causes a partial travel of said main piston; and a means for supplying pressurized air to said auxiliary piston.

References Cited

UNITED STATES PATENTS 3,362,603  1/1968  Bauer ---------------- 228—5

RICHARD H. EANES, Jr., Primary Examiner

U.S. Cl. X.R.

228—50